United States Patent
Stringham

(10) Patent No.: US 7,814,149 B1
(45) Date of Patent: Oct. 12, 2010

(54) CLIENT SIDE DATA DEDUPLICATION

(75) Inventor: Russell R. Stringham, Orem, UT (US)

(73) Assignee: Symantec Operating Corporation, Mountain View, CA (US)

( * ) Notice: Subject to any disclaimer, the term of this patent is extended or adjusted under 35 U.S.C. 154(b) by 162 days.

(21) Appl. No.: 12/240,441

(22) Filed: Sep. 29, 2008

(51) Int. Cl.
G06F 15/16 (2006.01)

(52) U.S. Cl. .................. 709/203; 709/217; 709/223; 709/224; 707/999.003; 707/758

(58) Field of Classification Search ............. 709/203, 709/217–219, 223–224; 707/999.003, 999.004, 707/758
See application file for complete search history.

(56) References Cited

U.S. PATENT DOCUMENTS

| | | | | |
|---|---|---|---|---|
| 6,269,381 | B1* | 7/2001 | St. Pierre et al. | 707/999.202 |
| 7,519,635 | B1* | 4/2009 | Haustein et al. | 707/999.204 |
| 7,539,710 | B1* | 5/2009 | Haustein et al. | 707/999.204 |
| 7,567,188 | B1* | 7/2009 | Anglin et al. | 707/999.202 |
| 2008/0244204 | A1* | 10/2008 | Cremelie et al. | 711/162 |
| 2009/0007261 | A1* | 1/2009 | Smith | 726/21 |
| 2009/0041230 | A1* | 2/2009 | Williams | 707/999.204 |
| 2009/0164529 | A1* | 6/2009 | McCain | 707/999.204 |
| 2009/0234892 | A1* | 9/2009 | Anglin et al. | 707/999.201 |
| 2009/0265399 | A1* | 10/2009 | Cannon et al. | 707/999.205 |
| 2009/0271454 | A1* | 10/2009 | Anglin et al. | 707/999.204 |
| 2010/0036887 | A1* | 2/2010 | Anglin et al. | 707/999.2 |
| 2010/0042790 | A1* | 2/2010 | Mondal et al. | 711/161 |
| 2010/0070478 | A1* | 3/2010 | Anglin | 707/674 |

OTHER PUBLICATIONS

Sean Quinlan and Sean Dorward, "Venti: a new approach to archival storage," USENIX Association, "Proceedings of the FAST 2002 Conference on File and Storage Technologies," Monterey California, Jan. 28-30, 2002, © 2002 by The USENIX Association, 13 pp.
Zhu et al., "Avoding the Disk Bottleneck in the Data Domain Deduplication File System," Abstract, *to appear in the Proceedings of the 6th USENIX Conference on File and Storage Technologies (FAST '08)*, San Jose, California, Feb. 2008, pp. 1-13.

* cited by examiner

*Primary Examiner*—Philip B Tran
(74) *Attorney, Agent, or Firm*—Campbell Stephenson LLP

(57) ABSTRACT

Methods and systems that use a client locality table when performing client-side data deduplication are disclosed. One method involves searching one or more client locality tables for the signature of a data unit (e.g., a portion of a volume or file). The client locality tables include signatures of data units stored in a deduplicated data store. If the signature is not found in the client locality tables, the signature is sent from a deduplication client to a deduplication server and added to one of the client locality tables. If instead the signature is found in the client locality tables, sending of the new signature to the deduplication server is inhibited.

21 Claims, 6 Drawing Sheets

CLIENT SIDE DATA DEDUPLICATION

FIELD OF THE INVENTION

This invention relates to storage systems and, more particularly, to performing data deduplication within a storage system.

DESCRIPTION OF THE RELATED ART

Data deduplication is a technique that is used to reduce the amount of storage space required in a system by detecting redundant copies of the same data and preventing multiple copies of the same data from being stored. For example, data deduplication is often used to reduce the amount of storage space needed to maintain backups of an organization's data.

In order to perform data deduplication, a system needs to be able to identify redundant copies of the same data. Because of the processing requirements involved in comparing each incoming unit of data with each unit of data that is already stored in the deduplication system, the detection is usually performed by comparing smaller data signatures of each data unit instead of comparing the data units themselves. This generally involves calculating a new signature (e.g., a hash or checksum) for each unit of data to be stored on the deduplication system and then comparing that new signature to the existing signatures of data units already stored by the deduplication system. If the new signature matches an existing signature, it indicates that a copy of the unit of data is likely to be already stored in the deduplication system (additional comparisons may be needed to verify this, in certain circumstances).

Unfortunately, existing techniques for detecting redundant copies often reduce system performance. For example, for a New Technology File System (NTFS) file system, each cluster is typically 4 Kilobytes (KB) in size. Attempting to apply data deduplication to a file system having clusters of that size requires that the unit size used for checking for duplicate data units be no larger than one cluster (4K) in size (while other sizes can be used to check for redundant copies, attempting to use sizes larger than the file system's cluster size typically results in significantly reduced rates of data reduction). A data deduplication system that contains 8 Terabytes (TB) of unique data will contain 2 billion 4K blocks. If each block's signature is 160 bits (20 bytes) in size, then storing just the signatures requires 40 GB of memory. As a result, these signatures cannot be held in computer memory on any but the most expensive computer systems. Accordingly, when processing a new data unit, one or more disk input and/or output operations (I/Os) are likely to be needed to search for the data unit's signature to determine if the new data unit is already stored by the deduplication system. Additionally, because each signature is likely to be far different from the signatures processed before and after it (e.g., if a hash function is used to generate the signatures), there will be little locality of reference among signatures and each I/O will require seeking to different parts of the disk, causing significant disk head movement and further reducing performance.

As the above example shows, once the amount of signatures becomes too large to be completely contained in memory, the distributed nature of the signatures practically guarantees that disk I/O and particularly disk seeking will begin to limit the scalability of the data deduplication system. This problem is exacerbated when smaller cluster sizes (such as the 4K size used in NTFS) are used, since the use of smaller cluster sizes results in more signatures than would be needed in a system that used a larger cluster size. Accordingly, depending upon the cluster size in use, even small data deduplication implementations can quickly exhaust available memory and suffer reduced performance due to needing to access non-localized signatures from disk.

SUMMARY OF THE INVENTION

Various embodiments of methods and systems for using a client locality table when performing client-side data deduplication are disclosed. In one embodiment, a method involves searching one or more client locality tables for a signature of a data unit (e.g., a portion of a volume or file). The client locality tables include signatures of data units stored in a deduplicated data store. If the signature is not found in the client locality tables, the signature is sent from a deduplication client to a deduplication server and added to one of the client locality tables. If instead the signature is found in the client locality tables, sending of the new signature to the deduplication server is inhibited.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
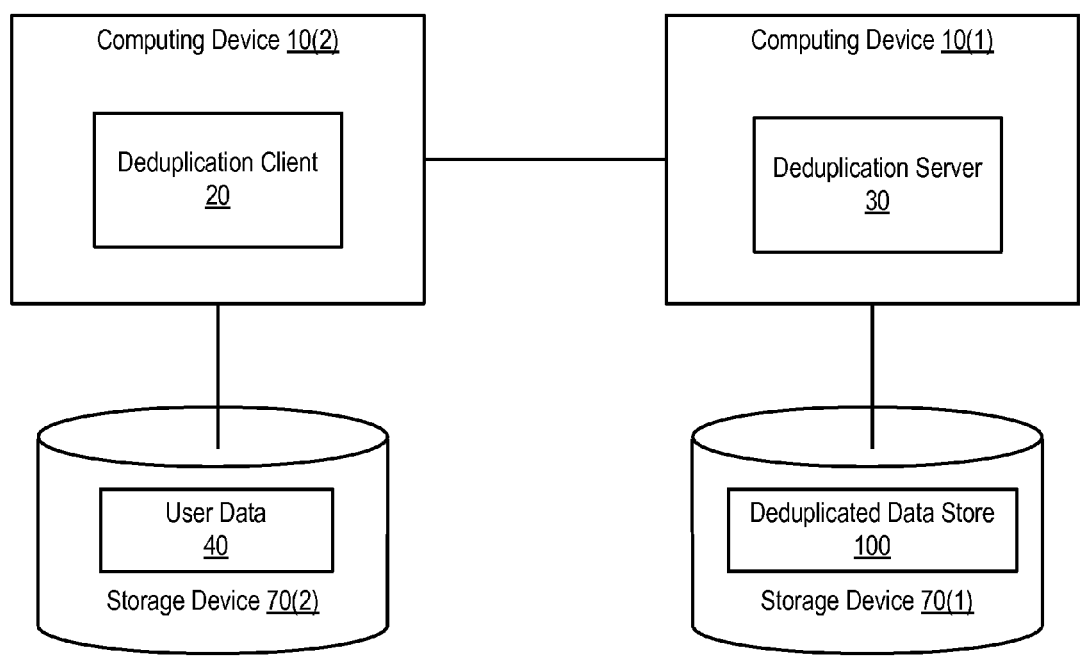
FIG. 1 is a block diagram of a distributed system that performs data deduplication, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Data deduplication involves reducing the number of copies of the same data that are stored by a particular storage system. For example, data deduplication can be used to achieve single-instance storage, in which only a single copy of each unique item of data is maintained on a storage system. Data deduplication can be performed by generating a signature for each item of data, and then using that signature to detect whether a copy of that item of data has already been stored on the storage system, as well as to identify where the item of data is stored. When a deduplication client attempts to store another copy of the same item of data to the storage system, the data item's signature will be compared to the signatures of the already stored data items in order to detect whether a copy of the item of data is already stored.

A deduplication client can track the order in which that client adds (or attempts to add) unique data items, such as clusters, to the deduplication system, and use this same ordering to create tables of signatures, which are referred to herein as locality tables. One or more such locality tables can be cached in the deduplication client's memory and/or stored in a storage device that is coupled to the deduplication client. These locality tables, which store signatures of clusters that were consecutively added to the data deduplication system by the client, are then used by the client to detect redundant copies. Since signatures within the locality tables are ordered based upon when corresponding clusters were added to the deduplication system, the locality tables have a higher hit rate than would be achieved if the signatures were cached based upon value. Accordingly, the use of locality tables can reduce the need for the client to access signatures on disk in order to determine whether a given unit of data is already stored by the deduplication system. If the client detects that a particular cluster is already stored by the deduplication system, the client does not need to send that cluster or its signature to the deduplication server that manages the deduplication system. This further reduces the resources (e.g., in terms of network bandwidth) needed to implement the deduplication system.

At many points in this disclosure, examples of volume-based data deduplication are provided. The same principles can be used to perform file-based or object-based deduplication. Thus, the techniques described herein can also be used to perform deduplication for particular logical objects (e.g., files), or portions of such objects, as opposed to performing deduplication on portions (e.g., clusters) of a volume or other storage device.

In many examples set forth herein, individual units or items of data are referred to as clusters. In some embodiments, clusters each have a constant size that is equal to a cluster size used by a file system that organizes the user data. In alternative embodiments, the size of items of data can vary among different items stored by the deduplication system and/or differ from the cluster size used by the particular file system(s) in operation.

FIG. 1 illustrates a distributed system that performs data deduplication. As shown, the system includes two computing devices 10(1) and 10(2). Each computing device can be a personal computer, laptop computer, server, personal digital assistant, cell phone, or the like. Computing device 10(1) implements a deduplication server 30, and computing device 10(2) implements a deduplication client 20. Computing device 10(1) is coupled to communicate with computing device 10(2) by a communication link such as a bus, interconnect, and/or network (e.g., a local area network (LAN), storage area network (SAN), wide area network (WAN) or the like).

Computing device 10(1) is coupled to storage device 70(1), which implements deduplicated data store 100. Similarly, computing device 10(2) is coupled to storage device 70(2), which stores user data 40.

Storage devices 70(1) and 70(2) each provide persistent data storage. Each storage device can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Storage device 70 can also be a virtual or logical storage device that is implemented on such physical storage devices and/or storage systems. For example, storage device 70(1) can be a logical volume that is implemented on a RAID storage system. For simplicity, items stored on storage devices 70(1) and 70(2) are sometimes referred to herein as being stored "on disk"; however, it is noted that it is not required that either storage device be a disk drive.

Deduplicated data store 100 is a storage area in which deduplicated data is stored. Deduplicated data store 100 can also include various metadata, such as locality tables, pointer tables, and the like, as discussed in more detail below, that is used to maintain and use deduplicated data store 100.

User data 40 includes various information that is generated and/or consumed by a user of computing device 10(2). User data 40 can include executable files, such as those used to implement applications and operating systems, as well as files that are used or generated by such executable files. User data 40 can included files generated by user applications (e.g., word processing programs, email programs, graphics programs, a database application, or the like) executing on computing device 10(2). Some of the user data may also be transferred to computing device 10(1) (e.g., via a network).

Deduplication client 20 is configured to interact with deduplication server 30 in order to add all or part of user data 40 to deduplicated data store 100. For example, deduplication client 20 can be part of a backup application that writes all or part of user data 40 to deduplicated data store 100.

Whenever a user (e.g., an application or human user) of computing device 10(2) indicates that all or part of user data 40 should be added to deduplicated data store 100, deduplication client 20 begins reading the selected portions of user data 40 from storage device 70(2). For each item of data included in the selected portions of user data 40, deduplication client 20 can calculate the signature (e.g., an identifier, which can be calculated to be a checksum or hash of the data item being identified) of that item and then determines, based upon locally-available information in one or more client locality tables, whether that item is already present in deduplicated data store 100. A client locality table identifies the signature of each item that deduplication client 20 has added or attempted to add to deduplicated data store. In one embodiment, signatures are arranged within each client locality table in the order in which deduplication client 20 added or attempted to add corresponding items of data to deduplicated data store 100.

The client locality tables are generated by deduplication client 20 and are maintained in a manner that persists across multiple deduplication sessions. In other words, information added to a client locality table in one session can still be included in that client locality table in a later session, without needing to be rewritten or reconstructed between or during intervening sessions. A session is a communication exchange between deduplication client 20 and deduplication server 30 that has a beginning and an end. Initiating, or opening, a session can involve deduplication server 30 authenticating and/or authorizing deduplication client 20, and then assigning a unique session identifier to the established session. During the session, deduplication client 20 can request that items of data be added to deduplicated data store 100 as well as request that items of data be retrieved from deduplicated data store 100. All messages conveyed as part of the session can include the session identifier assigned by deduplication server 30. Different sessions, even involving the same deduplication client, will have different session identifiers. In one embodiment, deduplication client 20 initiates a new session each time deduplication client wants to perform deduplication as part of a particular backup or restore operation.

If the client locality table indicates that the item has not already been added to deduplicated data store 100 (e.g., if the item's signature "misses in" (i.e., fails to match any signature stored in) all of the client's locality tables), deduplication client 20 can then send the signature of that item to deduplication server 30. Deduplication server 30 can look the signature up in a server-side locality table in order to see whether any client (not just deduplication client 20) has added the item having that signature to deduplicated data store 100. If the item is already present (e.g., as indicated by the item's signature "hitting in" (i.e., matching a signature stored in) one of the deduplication server's locality tables) in deduplicated data store 100, deduplication server 30 can return information to deduplication client 20 indicating that the item is already present and thus does not need to be communicated to deduplication server. If the item is not already present (e.g., as indicated by the item's signature failing to match any signature stored in any of the deduplication server's locality tables), deduplication server 30 can return information to the deduplication client 20 requesting that the item be transferred to deduplication server 30. When the item is added to deduplicated data store 100, deduplication server 30 can update one of its locality tables to include the item's signature. In either situation (e.g., regardless of whether deduplication server 30 indicates that the item is already present in deduplicated data store 100, deduplication client 20 can add the item's signature to one of its client locality tables.

If the client locality table indicates that the item is already stored in deduplicated data store 100 (e.g., if the item's signature matches a signature already stored in a client locality table), deduplication client 20 does not need to send the item itself or the item's signature to deduplication server 30. Accordingly, the use of client locality tables can reduce the amount of information needed to be transferred between deduplication client 20 and deduplication server 30 when a given item of data is already included in deduplicated data store.

While FIG. 1 illustrates a system that includes a single deduplication client, other embodiments may include multiple clients. In such embodiments, each client can store different data, such that different clients can send different data to deduplication server 30.

Similarly, while many of the examples presented herein assume that both the deduplication server and the deduplication client(s) implement locality and/or pointer tables, other embodiments can be implemented differently. For example, in one alternative embodiment, deduplication clients use locality and/or pointer tables but deduplication servers do not.

Figure 2:
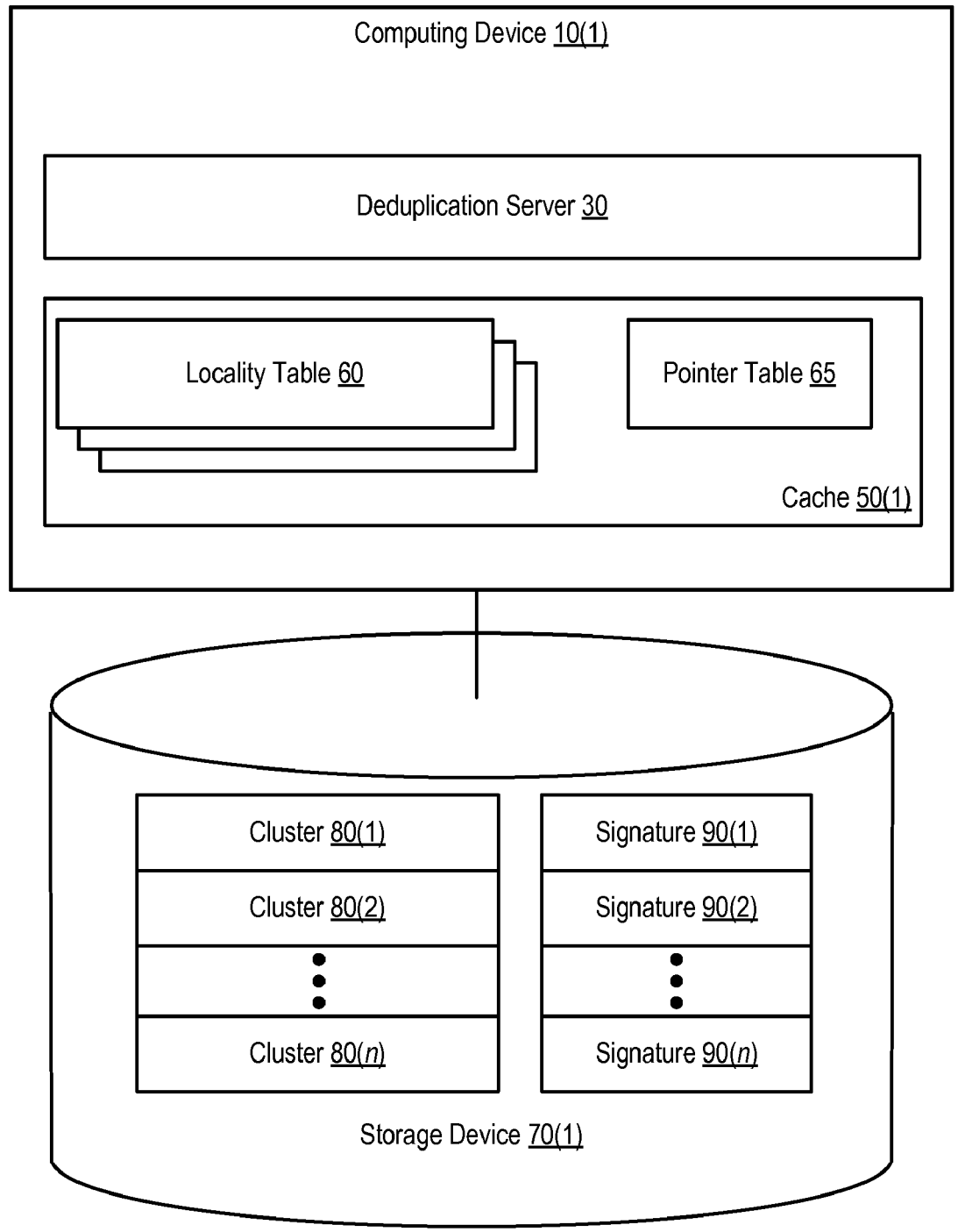
FIG. 2 is a block diagram of a computing device that implements a deduplication server, which uses a cached locality table when performing data deduplication, according to one embodiment of the present invention.

FIG. 2 shows a block diagram of a computing device used to implement a deduplication server. As shown, computing device 10(1) implements deduplication sever 30. Deduplication server 30 can be part of a file system, volume management or storage virtualization application, a stand-alone application that interfaces to a file system and/or volume management or storage virtualization application, or the like. Deduplication server 30 maintains a cache 50(1) that includes one or more locality tables 60 and a pointer table 65. Locality tables 60 and pointer table 65 are described in more detail below.

Storage device 70(1) stores information that makes up a deduplicated data store. In this example, the deduplicated data store includes clusters 80(1)-80(n) (collectively, clusters 80) of user data, which can be received from one or more deduplication clients, as well as signatures 90(1)-90(n) (collectively, signatures 90). Each signature is an identifier of a respective cluster. Thus, signature 90(1) identifies cluster 80(1), signature 90(2) identifies cluster 80(2), signature 90(n) identifies cluster 90(n), and so on. Typically, each cluster 80 is unique (i.e., no two clusters stored within clusters 80 have the same value).

The value of a given cluster that is presented to deduplication server 30 for storage in the deduplicated data store can be the same as or different from the value of any other cluster. As described briefly above, before writing a cluster to storage device 70(1), deduplication server 30 uses the cluster's signature to determine whether a copy of the cluster is already stored in the deduplicated data store. If a copy of the cluster is already stored, there is no need to store an additional copy. If instead no copy of the cluster is already stored, deduplication module 30 will obtain the cluster from the client requesting to add the cluster, and then add the obtained cluster to the set of clusters 80(1) through 80(n) (e.g., by appending the new cluster as cluster 80(n+1)).

In this example, the order in which unique clusters are written to storage device 70(1) is tracked by the order of the clusters within a list of clusters 80. In other words, each cluster that is written to storage device 70 is appended to the end of a list of clusters 80, such that the location of that cluster within the list indicates the order in which that cluster was written to storage device 70(1), relative to the other clusters stored in the list.

Alternatively, other techniques (e.g., involving timestamps, session identifiers, sequence numbers, or the like) can be used to track the order in which unique clusters are written to the deduplication system. For example, deduplication server 30 can generate a unique sequence number each time a new cluster is added to the deduplicated data store. This unique sequence number can be stored as part of deduplication server 30's locality table as well (e.g., each sequence number can be stored in the same locality table entry as the signature of the item with which that sequence number is associated). Furthermore, whenever a new cluster is added to the deduplicated data store, deduplication server 30 can return the sequence number associated with that cluster to the client that initiated adding the new cluster.

Deduplication server 30 uses signatures 90 to determine whether a given cluster is already stored on storage device 70(1). Each signature 90 can be a checksum or hash that is calculated based upon the data within the cluster. In many embodiments, signatures are generated in a manner (e.g., using a cryptographically strong, collision resistant hash function) that produces the same identifier for identical items of data, while also producing different identifiers for non-identical items of data. Regardless of which particular technique is used to generate signatures in the deduplication system, the same signature-generation technique is implemented by all deduplication clients of deduplication server 30. In general, signature generation is performed by deduplication clients (e.g., deduplication client 20 of FIG. 1).

By comparing the signature of a new cluster to the signatures of clusters already stored by the deduplication system, deduplication server 30 determines whether to add the new cluster to the deduplication system by writing that cluster to storage device 70(1). In particular, if a new cluster's signature does not match any existing signature 90, deduplication module 30 determines that the new cluster is not already stored within clusters 80. If a new cluster's signature does match an existing signature 90, deduplication server 30 determines that the new cluster is already stored and thus does not need to be written to storage device 70(1) (in some situations, such as those in which checksums are used as signatures, this determination may also involve comparing the new cluster to the existing cluster(s) that are identified by the matching signature).

Thus, when a signature of a new cluster is presented (e.g., by a deduplication client) to the deduplication server of FIG. 2, deduplication server 30 compares the new cluster's signature to the signatures 90 of clusters 80 already stored within storage device 70(1). To reduce the need to access storage device 70(1) to obtain existing signatures for this comparison, deduplication server 30 caches at least some of signatures 90 in one or more locality tables 60 in memory 50(1). Deduplication server 30 compares the new signature to the cached signatures in locality table(s) 60. If a match is found, deduplication server 30 determines (in some cases, after further comparing the new cluster to the existing cluster identified by the matching signature) that the new cluster is already stored on storage device 70(1).

If no match for the new signature is found in the cached locality table(s) 60, data deduplication server 30 searches the remaining signatures, stored on storage device 70(1), for a matching signature (this search may be initiated in parallel with the access to the cached locality table(s) in some embodiments). In some embodiments, deduplication server 30 caches a pointer table 65 in order to expedite this process. Pointer table 65 can cache information that indicates where, within the list of signatures 90, a desired signature is likely to be found. More details of pointer table 65 are provided below.

If the matching signature is found within signatures 90 on storage device 70(1), but that matching signature is not already cached, deduplication server 30 can cause one of the cached locality tables to be replaced with the locality table that includes the matching signature. If more than one locality table can be cached at a time, deduplication module 30 can implement a least recently used (LRU) replacement policy (other replacement policies can alternatively be used, if desired). Accordingly, deduplication server 30 can maintain state information for each cached locality table in order to track how recently the cached locality tables have been used (e.g., in terms of cache hits that occur when a matching signature is found in a locality table) relative to each other in order to implement an LRU cache replacement policy.

As noted above, a given locality table stores the signatures of unique clusters that were consecutively written to the deduplication system. Accordingly, instead of being grouped based upon, for example, value, the signatures within a given locality table are grouped based upon the relative order in which their corresponding clusters were added to the list of clusters 80. As also noted above, clusters can be added to the list of clusters 80 by appending new clusters to the end of the list. In such embodiments, the signatures for the new clusters can similarly be appended to the list of signatures 90, such that the order of signatures within the list indicates the order in which the clusters corresponding to those signatures were added. If instead other techniques (e.g., such as those involving using session identifiers, timestamps, and/or sequence numbers) are used to track the order in which clusters are added to the deduplication system, similar techniques can be used to track the order in which the corresponding signatures are added. For example, a timestamp identifying the time at which a cluster was added to the list of clusters 80, or a sequence number identifying the relative order in which the cluster was added to the list of clusters 80, can be associated with the cluster's signature. A session identifier identifying the session in which the cluster was added can also be associated with the cluster's signature (e.g., in addition to a timestamp).

In one embodiment, locality tables maintained by deduplication server 30 can each include signatures of clusters added to the deduplication system by multiple different clients. Similarly, the ordering (or ordering information, such as session identifiers, timestamps, and/or sequence numbers) associated with those clusters can indicate that order in which each cluster was added to the deduplication store with respect to each other cluster, irrespective of which client causes each cluster to be added.

In some embodiments, to increase locality, the locality tables maintained by deduplication server 30 are organized such that the signatures of clusters added by one client are stored in a different table than the signatures of clusters added by another client. Thus, the signatures of two clusters that are sequentially added may nevertheless be stored in different locality tables if those two clusters were added by different clients. This distinction can be made because if two clients add two different data sets to the deduplicated data store at overlapping times, it is unlikely that both will access the same two data sets in the same overlapping manner again. At the same time, there is a strong likelihood that one or both of those clients will access the data set that client added at a later time. Accordingly, storing signatures provided by different clients in different locality tables can increase the hit rate in the locality tables.

Deduplication server 30 groups signatures into locality tables such that signatures identifying consecutively-added clusters will be in the same locality table. In embodiments in which new signatures are appended to a list of existing signatures 90, this grouping can be performed by simply subdividing the list of existing signatures into tables of consecutive signatures (e.g., 1024 signatures can be included in each group, such that signatures 90(1)-90(1024) (not shown) are in the first table, signatures 90(1025)-90 (2048) (not shown) are in the second table, and so on). This technique also allows different groups to be ordered relative to each other. It is noted that once signatures have been grouped into tables, the ordering of signatures within a given table may be modified in certain situations, as described further below. If needed, information identifying the groupings of signatures (e.g., by identifying which signatures are included in each table through the use of addressing or other information) into locality tables can be stored on storage device 70(1) in a manner that allows individual locality tables to be constructed and loaded into cache 50(1).

If the order of signatures within a list of signatures does not indicate the order in which their corresponding clusters were added to the deduplication system, other information can be used to group the signatures into locality tables. For example, if each signature has an associated timestamp (e.g., indicating the time at which the cluster identified by that signature was added to the deduplication system), the signatures can be sorted into ascending timestamp order and then the sorted signatures can be grouped into tables. Similarly, if each signature has an associated sequence number (e.g., where ascending sequence numbers are assigned to consecutively added clusters and their associated signatures), the signatures can be sorted into ascending sequence number order and then grouped into tables. These techniques also allow tables to be ordered relative to each other.

Grouping signatures into locality tables based upon the order in which the clusters identified by those signatures were added (i.e., written) to the deduplication system increases the likelihood that a signature will be found in the currently cached locality table if the previously generated signature was also found in the currently cached locality table. This likelihood exists because the existence of duplicate files makes it likely that the same sequence of clusters will be handled multiple times. In general, while the signatures of a group of consecutively added clusters are likely to have very different values, there is a very high correlation between the order in which clusters are written and the order in which those clusters will appear when accessed again. Accordingly, when deduplication module 30 is processing new clusters, if deduplication module 30 processes a cluster that is already stored on storage device 70, there is a high probability that the next cluster that deduplication module 30 processes will be the same as the one that was processed immediately after this previously seen cluster when the previously seen cluster was first added to storage device 70.

This correlation arises because clients will usually access clusters within files or other objects (such as volumes) in the same order each time that a client attempts to add those files or other objects to the deduplicated data store (e.g., as part of a backup operation). Furthermore, many clients will have the same objects, and often those objects (e.g., files) will be accessed in the same order by each client.

As noted above, when there are more locality tables than can be stored in cache 50(1) by deduplication server 30 (e.g., when the memory space allocated to cache 50(1) is smaller than the amount of space required to store all existing locality tables), deduplication server 30 can implement a cache replacement policy to swap locality tables into and out of cache 50(1) from storage device 70(1). In some situations, locality tables can be loaded from storage device 70(1) into cache 50(1) in situations other than misses (i.e., the failure to find a match for a signature) in the currently loaded locality tables. For example, in situations in which locality tables are ordered relative to each other, if the most recently added signature (i.e., the last signature or the signature corresponding to the cluster that was most recently added to storage device 70(1), relative to the other clusters identified by signatures in the same locality table) within a given locality table is a match for a new signature received from a deduplication client, deduplication server 30 can preemptively load the next consecutive locality table from storage device 70(1) into cache 50(1), since the next signature that is likely to be generated is the signature of the first (in relative order) signature of the next consecutive locality table. Thus, if the current cached locality table caches signatures 90(1)-90(1024), and if deduplication server 30 matches the signature of a new cluster to signature 90(1024), deduplication server 30 can preemptively load the next locality table, containing signatures 90(1025)-90 (2048), into cache 50(1).

As noted above, more than one locality table may be stored in cache 50(1) at the same time. This provides advantages when situations arise in which a few, but not all, of the clusters in a stream of clusters are modified before being rewritten to the deduplication system. In other words, if only one locality table is cached at a time, and if a certain cluster ordering is established and then later an additional cluster is added between two previously consecutively processed clusters, the locality table would be replaced upon the first miss (when the first inserted cluster was processed) and then reloaded into the cache when the next cluster after the inserted cluster(s) was processed. If multiple locality tables are stored in cache 50(1), the locality table would not need to be removed from the cache and then subsequently reloaded.

The appropriate number of locality tables to keep in memory is likely to be relatively small. For example, if the deduplication system stores 8 Terabytes of data, there are 1024 signatures per table, and the cluster size is 4K, the deduplication may have two million locality tables, yet it may be desirable to only cache ten or so locality tables per client at any given time. Having more tables cached may result in more processing time being spent searching those cached tables, often in vain, for a match. Determining the appropriate number of tables for a given system can be determined, for example, through benchmarking tests or simulation.

The locality tables themselves can be organized in a variety of different ways. In one embodiment, signatures within each locality table are arranged in the order in which the clusters identified by those signatures were added to the deduplication system. Accordingly, the mere position of a signature within a locality table indicates the order in which the cluster identified by that signature was added to the deduplication system, relative to other clusters identified by other signatures within the same locality table. Furthermore, if the clusters are similarly arranged in consecutive order, the position of the signature within the locality table, and the relative order of that locality table within a set of locality tables, can be used to locate the corresponding cluster within deduplication system.

In embodiments like this, only signatures (as opposed to signatures plus other information, such as session identifiers, timestamps, sequence numbers, and/or addressing or other location information used to locate corresponding clusters) may be stored in locality tables. In such embodiments, deduplication server 30 can search the locality tables by performing a linear search for a matching signature, and then using the position of that signature within the table to locate the corresponding cluster, if needed.

In other embodiments, additional information (such as session identifiers, timestamps, sequence numbers, and/or addressing or other location information used to locate corresponding clusters) can be stored in the locality tables. In at least some such embodiments, the signatures can be rearranged within the locality table. For example, if each signature is associated with a respective timestamp, the timestamps can be used to group signatures into locality tables, as described above. The signatures within the resulting locality tables can then be sorted in ascending or descending order. The timestamp associated with each signature will indicate the relative temporal order (and can also be used to locate the corresponding cluster, if clusters and their signatures share the same timestamps) of the signatures. However, the newly sorted arrangement of the signatures allows deduplication server 30 to search for a signature by performing a binary search of the locality table rather than a linear search.

In embodiments in which only signatures are maintained, generation of locality tables can involve generating additional information that identifies the original position of each signature within the locality table, storing the appropriate additional information with each signature, and then rearranging the signatures. For example, in one embodiment, each signature is supplemented with information identifying the original position (e.g., from zero to 1023 within a 1024-entry locality table) of that signature within the locality table. The supplemented signatures within each locality table can then be sorted in order to facilitate binary searching. Meanwhile, the supplemental information allows the original temporal ordering to be identified, which can in turn allow deduplication server 30 to locate the cluster corresponding to each signature.

As noted above, pointer table 65 can also be used to expedite processing of new clusters being presented to a deduplication system. Pointer table 65 includes information, which is indexed or otherwise searchable based upon a portion of the signature of a new cluster, that indicates (e.g., by specifying an address or offset) which of several subsets of signatures is likely to contain the signature of the new cluster. For example, if signatures are kept in a list like that shown in FIG. 2, the pointer table 65 can store information indicating offsets within the list. By using pointer table 65 to identify a particular subset of signatures, deduplication server 30 can avoid having to search all of the on-disk signatures if there is a miss for the new signature in the cached locality table(s). In particular, the use of pointer table 65 can reduce the amount of I/O activity needed for deduplication server 30 to determine whether a new data unit is already stored by the deduplication system.

In some embodiments, a separate sorted copy of all of the signatures is maintained on storage device 70(1) (e.g., in addition to a temporally-ordered copy like the list of signatures 90 shown in FIG. 1), and pointer table 65 identifies a subset of the signatures within the sorted copy. Since the sorted copy is already sorted, subsets of the sorted copy can be searched using a binary search.

In one embodiment, pointer table 65 is organized as array. For example, pointer table 65 can be a 32-bit array with $2^{24}$ entries, which requires 64 MB of memory. This example configuration is referred to several times below; however, it is noted that other configurations can also be implemented.

For an empty deduplication system in which no clusters have yet been written to the data deduplication store implemented on storage device 70(1), each entry is initialized with a value of zero. The value in each entry represents the index of an on-disk structure, which stores a subset of a sorted list of signatures. In one embodiment, the on-disk structures are all contained within a single flat file, and each structure is 32K in size, so multiplying the on-disk index value by 32K gives the offset within this signature file which contains the desired on-disk structure. Other data structures and sizes can be used in other embodiments.

A sample implementation, in which signatures are 160 bits in size, for the entries in pointer table 65 and the on-disk structures could be:

```
struct Entry {
    char signature [20];
    char index [5];
};
struct OnDiskStruct {
    uint16_t   count;           // num of used Entry objects
    uint32_t   nextStruct;      // index of next structure
    Entry      entries [1310];  // sorted by signature
    char       padding [12];    // bring size to 32K
};
```

If there are initially no clusters stored by the deduplication system, the flat file can be initialized with a single instance of the on-disk structure ("OnDiskStruct") where the entries field is set to zero and the nextStruct is set to −1 (or another predefined value), representing no next structure.

To determine if a particular signature is already present in the deduplication system of this example, deduplication server 30 can use the first 24 bits of the 160 bit signature (e.g., as received from a deduplication client) to index into the in-memory pointer table 65 (e.g., deduplication server 30 can search the index portion of each Entry for a value that matches the first 24 bits of the signature). The entry found in pointer table 65 at this index can be multiplied by 32K (the size of the on-disk structures) to determine an offset in the flat file. Deduplication server 30 can then read 32K (again, the size of the on-disk structure) from this offset. This 32K section contains the subset of the signatures identified by the pointer table 65, given the new signature being processed by deduplication server 30.

Deduplication server 30 can then perform a binary search of the signatures in the subset for the new signature. If the new signature is found, then the Entry index (in OnDiskStruct) provides a 40-bit value (e.g., an offset into a list of clusters) indicating where the associated cluster is located on storage device 70(1). In one embodiment, this 40-bit value can be multiplied by 4K (the cluster size) to give the offset within a flat file that contains the actual clusters, thus allowing this file to contain up to $2^{40}$ 4K blocks or $2^{52}$ bytes. In another embodiment, the index of the Entry contains the index of the locality table that contains this signature, and that locality table must be loaded to find the actual location of the cluster within the data store. In this case, the index's size can be smaller, perhaps only 3 or 4 bytes.

If the new signature is found, deduplication server 30 can load the corresponding locality table containing that signature (e.g., as determined using the offset into the list of clusters to locate the appropriate cluster and its corresponding signature within the on-disk locality tables) into memory, thus adding that locality table to cache 50(1). Deduplication server 30 can also determine that the new cluster is already stored by the deduplication system and thus does not need to be added to storage device 70(1). In response to this determination, deduplication server 30 can return information to the deduplication client that sent the cluster's signature indicating that the deduplication client does not need to send the cluster to the deduplication server. As described in more detail below, this information can also include information that deduplication server 30 uses to identify and/or locate the cluster (e.g., such as an index or offset identifying the location of the cluster within the list of clusters 80, or a session identifier, sequence number, and/or timestamp used to identify when the cluster was added to the list of clusters 80 relative to the other clusters in the list).

In some implementations, if the signature is larger than the largest signature in the on-disk structure identified by pointer table 65, then the on-disk structure indicated by the nextStruct value must also be loaded and checked by deduplication server 30 (e.g., this determination can be made by simply comparing the new signature to the last signature in the structure). If the in-memory and on-disk structure are properly configured (e.g., in terms of entry size and number of entries per structure, as determined using, for example, simulation or benchmark testing) for the number of signatures, then due to the distribution of signatures, it is extremely unlikely that the signature would also be larger than the largest signature in this next structure.

If the signature is not found in any on-disk structure (thus indicating that the signature is also not in any non-cached locality table), then the new cluster is not contained within the deduplication system and deduplication server 30 will request that the deduplication client that sent the signature now send the cluster identified by that signature, so that the cluster and its signature can be written to storage device 70(1). In response to writing the cluster to storage device 70(1) (or, in some embodiments, as part of the request sent by deduplication server 30), deduplication server 30 can also send the deduplication client information (e.g., such as an index or offset, session identifier, timestamp, and/or sequence number) used by the deduplication server to identify and/or locate the cluster.

Deduplication server 30 can also update the on-disk structures that store the sorted signatures each time a new signature is added to the deduplication system. In the example above, the structures are each configured to contain 1310 entries. If there are fewer than 1310 (or other maximum number of) entries in the structure that was identified by pointer table 65 and searched for the new signature, deduplication server 30 can insert a new entry into the appropriate location in that structure, maintaining its sorted order, and write the structure back to storage device 70(1). If instead there are already 1310 (or other maximum number of) entries in the structure, then there is no room for a new entry in the current structure. In such situations, deduplication server 30 can allocate a new structure (e.g., at the end of the flat file containing the structures) and put the second half of the entries from the current structure into the new structure, while also inserting the new entry into the appropriate structure. The nextStruct attribute of the new structure can be set equal to the current nextStruct attribute of the current structure. Then, the nextStruct attribute of the current structure can be set equal to the index of the new structure.

When a new structure is added, deduplication server 30 can then extract the first 24 bits of the signature of the last entry remaining in the current structure. The in-memory pointer table 65 can then be updated so that all values in the table starting one number higher than this 24-bit value and continuing through all entries that point to the current structure are updated to point to the new structure.

As mentioned earlier, when checking for a signature in a structure, if the signature value is higher than the highest entry in the structure, then the next structure may also be checked. The likelihood of needing to access this next structure can be reduced if, when a structure is split, rather than splitting the structure evenly, deduplication server 30 attempts to split the structure so that all entries that share the same first 24 bits go into the same structure.

In one configuration using the above structure definition (i.e., with a maximum of 1310 entries), the structures are typically about three-quarters full (e.g., about three-quarters of the entries of each structure are allocated and have valid values). Deduplication server 30 can be configured to split structures in a manner that increases the utilization of one or both of the structures that result from the split (e.g., by maximizing the number of allocated entries in one of the resulting structures).

While the above example focused on pointer tables having 32 bits per entry and 32K structures, other embodiments can use other pointer table and/or structure sizes. For example, 32 bit entries may be satisfactory in configurations having 16 TB of unique data and a 4K cluster size (which leads to about four billion signatures for the system). In systems handling larger amounts of data, increased pointer table size may be desirable. For example, for each power of 2 in which the number of signatures expected in a given configuration exceeds four billion, it may be desirable to add an additional bit to the pointer table size or to double the size of the structures. Thus, for an implementation having 8 billion signatures, the pointer table size could be 25 bits and/or the structures could be 64K in size.

In one embodiment, each structure is limited to storing only those signatures that have one or more identical bytes (e.g., one embodiment may require that all signatures in the same structure have the same first two bytes). The value of the identical byte(s) can be stored a single time in the structure and omitted from the individual entries in the structure. This allows more signatures to be represented in the structure than would otherwise be possible, since redundant information does not need to be stored multiple times.

The use of a pointer table can significantly increase the likelihood that only a single I/O operation to read an on-disk structure (or possibly two such I/O operations in certain circumstances like those described above) will be needed to determine whether a new data unit is not already stored by a deduplication system, if that new data unit cannot be found in a cached locality table. This increases the performance of the deduplication system relative to systems that must read all signatures until a matching signature is found, since signature matching in those systems is likely to involve significantly more than one I/O operation. Additionally, the relatively small size of the pointer table does not adversely impact the memory requirements of the system in which the pointer table is implemented. For example, in embodiments configured like the example described above, only 64 MB of memory is needed to store a pointer table that handles 4 billion signatures.

Figure 3:
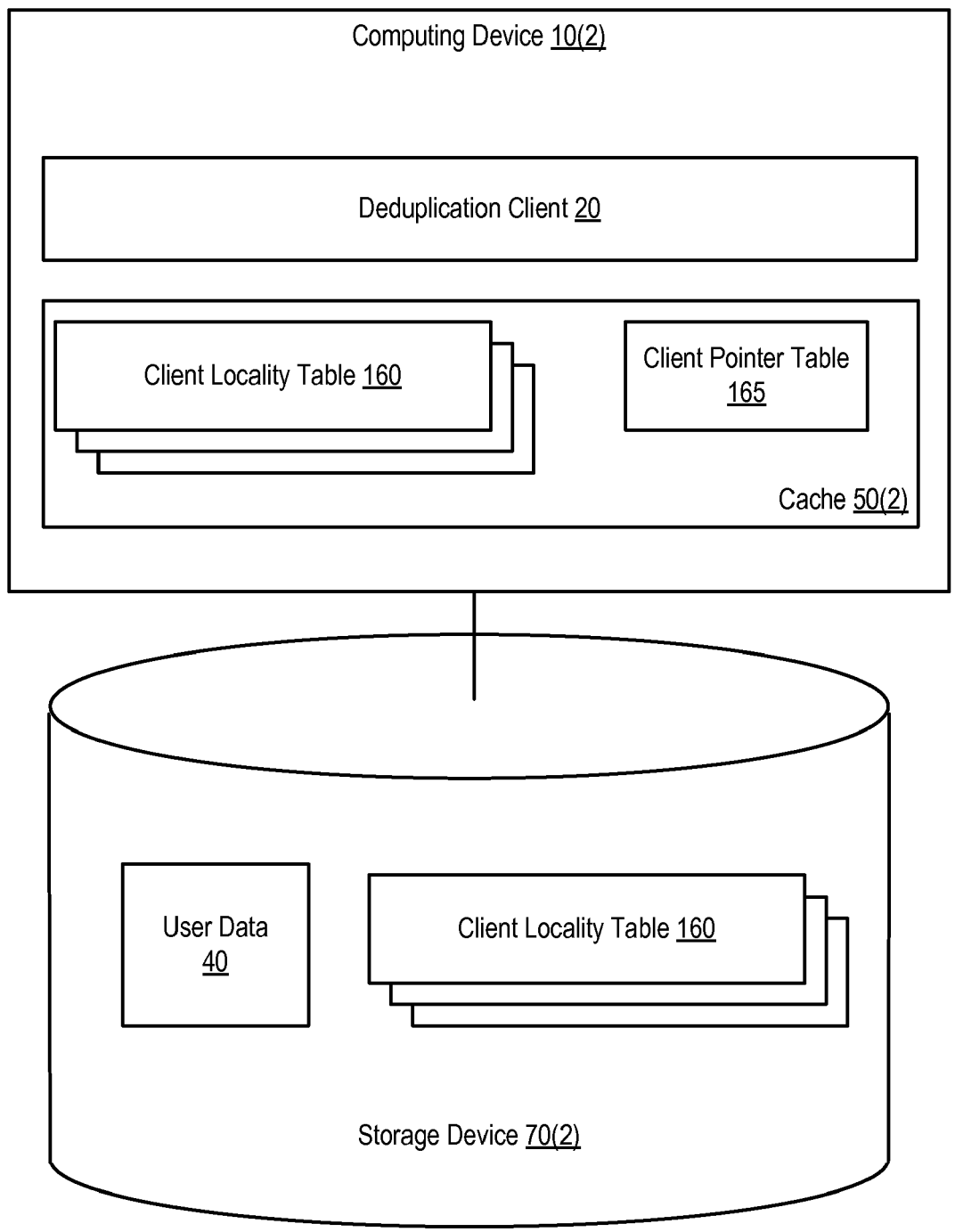
FIG. 3 is a block diagram of a computing device that implements a deduplication client, which uses a client locality table when performing data deduplication, according to one embodiment of the present invention.

FIG. 3 is a block diagram of a computing device that implements a deduplication client. As shown, computing device 10(2) implements deduplication client 20. Like deduplication server 30 of FIG. 2, deduplication client 20 can be part of a file system, volume management or storage virtualization application, a stand-alone application that interfaces to a file system and/or volume management or storage virtualization application, or the like. Deduplication client 30 maintains a cache 50(2) in computing device 10(2)'s memory that includes one or more client locality tables 160 and a client pointer table 165. In general, the techniques described above for creating, using, and maintaining locality tables and pointer tables for a deduplication server can also be applied to deduplication client, with certain exceptions noted below.

Storage device 70(2) stores user data 40, as well as one or more client locality tables 160. Deduplication client 20 can add all or part of the information in user data 40 to a deduplicated data store maintained by a deduplication server.

Whenever a user (e.g., an application or human user) requests that deduplication client 20 add all or part of user data 40 to the deduplicated data store (e.g., as part of a regularly scheduled full or partial backup of the client system), deduplication client 20 will read each cluster of user data 40 to be added to the deduplicated data store from storage device 70(2) and calculate the signature of that cluster. As noted above, each signature 90 can be a checksum or hash of the data within the cluster.

Deduplication client 20 can then compare the newly calculated signature to signatures stored in one or more client locality tables 160. Client locality tables 160 contain the signatures of all clusters that have been added (or were attempted to be added) to the deduplicated data store by deduplication client 20. Accordingly, client locality tables 160 can include some, but not all, of the information maintained in a deduplication server's locality table in embodiments in which multiple deduplication clients that have different sets of user data are present.

By comparing the signature of a new cluster to the signatures of clusters already added to the deduplication system by deduplication client 20, deduplication client 30 determines whether to send the signature of the new cluster to the deduplication server. If the signature of the new cluster matches a signature in the client locality tables 160, it indicates that deduplication client 20 has already added the new cluster to the deduplicated data store, and thus there is no need to send the new cluster or its signature to the deduplication server.

Accordingly, deduplication client 20 can use client locality tables 160 to decrease the amount of traffic between deduplication client 20 and the deduplication server.

If instead the signature of a new cluster does not match any of the signatures stored in the client locality tables 160, it indicates that this particular deduplication client 20 has not added or attempted to add this cluster to the deduplicated data store. In this situation, deduplication client 20 adds the signature of the new cluster to one of its client locality tables (e.g., by appending the signature to the end of a list of signatures) and sends the signature of the new cluster to the deduplication server. In response, the deduplication server can check its locality tables (as described above) in order to determine whether the new cluster is already present in the deduplicated data store (e.g., the new cluster could have been added by a client other than deduplication client 20). Based upon whether the deduplication server finds a match for the signature, the deduplication server will respond by either indicating that the new cluster is already stored or requesting that deduplication client 20 send the new cluster to the deduplication server so that it can be stored.

In some embodiments, to reduce the need to access storage device 70(2) to obtain signatures for this comparison, deduplication client 20 caches at least one client locality table 160 in memory 50(2). Deduplication client 20 compares the new signature to the signatures in the cached client locality table(s) 160. If a match is found, deduplication client 20 determines that the new cluster is already included in the deduplicated data store.

If no match for the new signature is found in the cached client locality table(s) 60, data deduplication client 20 searches the remaining signatures in the non-cached client locality table(s) 160, stored on storage device 70(2), for a matching signature (this search may be initiated in parallel with the access to the cached client locality table(s) in some embodiments). In some embodiments, deduplication client 30 caches a client pointer table 165 in order to expedite the search of the non-cached client locality tables. Client pointer table 165 can be cached in memory (e.g., stored in the portion of computing device 10(2)'s memory allocated to deduplication client 20's cache 50(2)), as shown in FIG. 3, in at least some embodiments. Client pointer table 165 can store information that indicates which non-cached client locality table 160 is likely to store a desired signature. More details of client pointer table 165 are provided below.

In embodiments that cache one or more client locality tables, if the matching signature is found within a non-cached client locality table on storage device 70(2), deduplication client 20 can cause one of the cached client locality tables to be replaced with the client locality table that includes the matching signature. If more than one client locality table can be cached at a time, deduplication client 20 can implement a least recently used (LRU) replacement policy (other replacement policies can alternatively be used, if desired). Accordingly, deduplication client 20 can maintain state information for each cached client locality table in order to track how recently the cached client locality tables have been used (e.g., in terms of cache hits that occur when a matching signature is found in a client locality table) relative to each other in order to implement an LRU cache replacement policy.

Client locality tables can also be loaded from storage device 70(2) into cache 50(2) in situations other than misses in the currently loaded client locality table(s). For example, in situations in which client locality tables are ordered relative to each other, if the most recently added signature within a given locality table is a match for a new signature, deduplication client 20 can preemptively load the next consecutive locality table from storage device 70(2) into cache 50(2).

A given client locality table stores the signatures of unique clusters that were added to the deduplication system (or attempted to be added to the deduplication system, if the deduplication already stored a cluster when deduplication client 20 attempted to add that cluster) by deduplication client 20. In some embodiments, the signatures within each client locality table are grouped into a particular locality table based upon the order in which their corresponding clusters were added to the deduplication system (e.g., by sending those clusters and/or their corresponding signatures to the deduplication server). In one embodiment, the position of each signature within a client locality table, and the order of that client locality table with respect to other client locality tables, if any, indicates the order in which deduplication client 20 added the cluster corresponding to that signature to the deduplicated data store, relative to the other signatures maintained in the same client locality table and/or other client locality tables.

For example, in a manner similar to that described above with respect to deduplication server 30, deduplication client 20 can maintain a list of signatures (e.g., on storage device 70(2)). Each time deduplication client 20 adds or attempts to add a new cluster to the deduplicated data store, deduplication client 20 can append the new cluster's signature to the list of signatures. Each client locality table can then simply be a portion or subset of this list, and different client locality tables can be identified using offsets within the list.

If instead other techniques (e.g., such as those involving using session identifiers, timestamps, and/or sequence numbers generated by the deduplication server) are used to track the order in which clusters are added to the deduplication system, the order in which the corresponding signatures are added can be tracked using the timestamps or sequence numbers. For example, a timestamp identifying the time at which a cluster was added to the deduplicated data store, or a sequence number identifying the relative order in which the cluster was added to the deduplicated data store, can be associated with the cluster's signature. The signatures can be stored in a list that can be sorted based upon timestamp or sequence number. The client locality tables can then be obtained from this sorted list (e.g., the first 1024 signatures in the sorted list can be used as the first client locality table, the next 1024 signatures in the sorted list can be used as the second client locality table, and so on).

Thus, deduplication client 20 can group signatures into client locality tables 160 such that signatures identifying consecutively-added clusters will be in the same client locality table. Once signatures have been grouped into client locality tables, the ordering of signatures within a given client locality table may be modified in certain situations, as described with respect to deduplication server 30 above (e.g., the signatures can be resorted based upon value, to allow binary searching of the client locality tables). As noted above, grouping signatures into locality tables based upon the order in which the clusters identified by those signatures were added (i.e., written) to the deduplication system increases the likelihood that a signature will be found in the currently cached locality table if the previously generated signature was also found in the currently cached locality table.

It is noted that a given locality table or set of locality tables can include signatures that were added to the locality table(s) by deduplication client 20 during different sessions. In other words, a given client locality table can include one signature that deduplication client 20 added to the locality table during a first deduplication session and another signature that deduplication client 20 added to the locality table during a second deduplication session. The locality table(s) can be maintained throughout multiple deduplication sessions, without needing to reconstruct the locality table(s) each session.

Each time deduplication client 20 adds or attempts to add a new cluster to the deduplicated data store, deduplication client 20 sends the signature of that new cluster to the deduplication server. As noted above, in some embodiments, the deduplication server can respond to such an addition or attempted addition by returning information (e.g., an index or offset into the deduplication server's list of clusters, a sequence number indicating the relative order (with respect to other clusters in the deduplicated data store) in which the cluster was added or in which the cluster's addition was first requested, or a timestamp indicating when the cluster was added or its addition was first requested) that the deduplication server uses to locate and/or identify the cluster being added and/or its signature. In response to receiving such information from the deduplication server, deduplication client 20 can store the returned information in the client locality table that stores the associated signature.

Deduplication client 20 can then use this information to later request a copy of the cluster from the deduplication server. For example, if the deduplication server returns a sequence number in response to an attempt to add a cluster to the deduplicated data store, deduplication client 20 can store this sequence number in a manner that associates the sequence number with the cluster's signature. If a copy of the cluster is later needed (e.g., as part of a restore operation requested by a backup application that interacts with and/or includes deduplication client 20) from the deduplicated data store, deduplication client 20 can request a copy of the cluster using the sequence number. In such an embodiment, the sequence number can be used in the request instead of the signature.

In many situations, deduplication client 20 will be processing numerous clusters at substantially the same time. In some embodiments, in order to reduce the traffic between deduplication client 20 and the deduplication server, deduplication client 20 is configured to include more than one signature or other cluster identifying information in each message sent to the deduplication server. Messages can include up to a maximum number of signatures (e.g., as constrained by the size of the signatures, the size of the messages, and the amount of other information needed to be included in each message). For example, if deduplication client 20 is adding multiple clusters to the deduplicated data store, deduplication client 20 can temporarily save all signatures that do not match the signatures in any of client locality tables 160. When deduplication client 20 temporarily saves at least the maximum number of signatures (or when processing finishes), deduplication client 20 can insert up to the maximum number of signatures into a message and send that message to the deduplication server (the message can also indicate that the deduplication client is requesting to add the clusters identified by each signature to the deduplicated data store maintained by the deduplication server). If there are remaining temporarily saved signatures, deduplication client 20 can similarly generate one or more additional messages, as needed.

Likewise, if deduplication client 20 needs to request a copy of one or more clusters from the deduplication server, deduplication client 20 can include information identifying multiple clusters in a single message (the message can also indicate that the message is a request to retrieve a copy of the identified clusters from the deduplicated data store). In some embodiments (e.g., in which the deduplication server does not provide deduplication client 20 with information used by the deduplication server to identify and/or locate clusters), such a message will identify each cluster by its signature.

If instead deduplication client 20 has received information (e.g., an index or offset, timestamp, or sequence number) used by the deduplication server to identify and/or locate each cluster, deduplication client 20 can include this information in the message(s), instead of the signatures. In many situations, given the ordered nature in which clusters are added to the deduplicated data store described above, the identifiers used to describe a particular object will be sequential. For example, if deduplication client 20 adds a file that includes multiple clusters to the deduplicated data store, the deduplication server is likely to receive the clusters making up that file (or the requests to add those clusters) in sequential order, such that those clusters will be assigned consecutive sequence numbers (e.g., sequence numbers 15-22).

When deduplication client 20 later attempts to retrieve this file from the deduplicated data store, deduplication client 20 can encode the sequence numbers identifying the clusters in that file into a message as a run list, instead of listing each sequence number individually within the message. For example, the set of sequence numbers could be represented as a run list that includes a start value, a count, and an increment. Thus, the set of sequence numbers 15-22 could be represented as {start value=15; count=7, increment=1}. Multiple run lists can be used to represent a single object. For example, if the same cluster is repeated multiple times within a file, the request to retrieve that file could include a run list that identifies the sequence number of the repeated cluster as the start value, the count equal to the number of times the cluster is repeated, and an increment equal to zero. When the number of clusters to be retrieved is large and contains many repeated or consecutively-identified clusters, the amount of information needed to specify a run list can be significantly less than amount of information that would be needed to specify each cluster individually.

There are other formats for specifying a run list. For example, in embodiments in which the increment value is assumed to be one if no specific increment value is provided, the increment value can be omitted from at least some messages. Alternatively, a run list can be specified by a start value and an end value. Again, an increment of one can be assumed. Other techniques for specifying run lists can also be used.

In some embodiments, the list of clusters maintained by the deduplication server may be modified (e.g., in response to certain clusters no longer being needed for any backups). In these situations, the deduplication server may generate a message identifying that certain information is no longer valid. In response to receiving such information, deduplication client 20 can invalidate (e.g., by removing) certain information in its client locality tables and/or client pointer table. For example, the deduplication server can send a message identifying that the clusters added to the deduplicated data store in all sessions having identifiers less than X are no longer guaranteed to be present in the deduplicated data store. In response to such a message, deduplication client 20 can search its client locality tables and/or client pointer table and invalidate any information associated with the identified sessions.

In order to be able to retrieve individual objects (e.g., files), deduplication client 20 can store metadata information identifying the signatures and/or other identifiers of each cluster in that file. This metadata information can also be added to the deduplicated data store.

Like the deduplication server's pointer table 65, client pointer table 165 can also be used to expedite the processing of clusters. Client pointer table 165 includes information, which is indexed or otherwise searchable based upon a portion of the signature of a new cluster, that indicates (e.g., by specifying an address or offset) a subset of the signatures stored on storage device 70(2) that is likely to contain the signature of the new cluster. By using client pointer table 165 to identify a particular subset of the signatures, deduplication client 20 can avoid having to search all of the on-disk signatures if there is a miss for the new signature in the cached client locality table(s). In general, deduplication client 20 can use the techniques described above with respect to the deduplication server's pointer table to create, use, and maintain client pointer table 165.

Thus, in some embodiments, creation of client pointer table 165 involves creating a separate sorted (based upon signature value) copy of all of the signatures in the client locality tables 160 and storing this value-sorted copy on storage device 70(2). In such situations, client pointer table 165 identifies a subset of the signatures within the value-sorted copy. The matching signature within the identified subset can in turn identify or be used to identify the client locality table containing the matching signature, if any. Accordingly, if a matching signature exists, client pointer table 165 can indirectly identify the client locality table that contains the matching signature by directly identifying a subset of the value-sorted list of signatures. Since the value-sorted copy is already sorted, subsets of the value-sorted copy can be searched using a binary search.

In one embodiment, client pointer table 165 is organized as array like that described above with respect to pointer table 65 of FIG. 2, using structures similar to the Entry and OnDiskStruct structures set forth above. For example, client pointer table 165 can be a 32-bit array with $2^{24}$ entries, which requires 64 MB of memory. This example configuration is referred to several times below; however, it is noted that other configurations can also be implemented.

If deduplication client 20 has not yet attempted to add any clusters to the data deduplication store, each entry in client pointer table 165 is initialized with a value of zero. The value in each entry represents the index of an on-disk structure, which stores a subset of the value-sorted list of signatures. In one embodiment, the on-disk structures are all contained within a single flat file, and each structure is 32K in size, so multiplying the on-disk index value by 32K gives the offset within this value-sorted signature file which contains the desired on-disk structure. Other data structures and sizes can be used in other embodiments.

If deduplication client 20 has not yet attempted to add any clusters to the deduplication system, the flat file can be initialized with a single instance of the on-disk structure where the entries field is set to zero and the nextStruct is set to –1 (or another predefined value), representing no next structure.

To determine if a particular signature is already present in deduplication client 20's client locality tables 160 in this example, deduplication client 20 can use the first 24 bits of the 160 bit signature to index into the client pointer table 165 (e.g., deduplication client 20 can search the index portion of each Entry for a value that matches the first 24 bits of the signature). The entry found in pointer table 65 at this index can be multiplied by 32K (the size of the on-disk structures) to determine an offset in the flat file. Deduplication client 20 can then read 32K (again, the size of the on-disk structure) from this offset. This 32K section contains the subset of the signatures identified by the client pointer table 165, given the new signature being processed by deduplication client 20.

Deduplication client 20 can then perform a binary search of the signatures in the subset for the new signature. If the new signature is found, then the Entry index (in OnDiskStruct) can contain the index or address of the locality table that contains this signature.

If the new signature is found, deduplication client 20 can load the corresponding locality table containing that signature into memory, thus adding that locality table to cache 50(2). Deduplication client 20 can also determine that the new cluster is already stored by the deduplication system and thus the new cluster's signature does not need to be sent to the deduplication server.

In some implementations, if the signature is larger than the largest signature in the on-disk structure identified by client pointer table 165, then the on-disk structure indicated by the nextStruct value must also be loaded and checked by deduplication client 20 (e.g., this determination can be made by simply comparing the new signature to the last signature in the on-disk structure).

If the signature is not found in any on-disk structure (thus indicating that the signature is also not in any client locality table), then the new cluster has not yet been added to the deduplication system by the deduplication client. Accordingly, deduplication client 20 will send the signature of that new cluster to the deduplication server, which can in turn determine whether any other client has already added that cluster to the deduplicated data store.

In many situations, several computing devices will have identical configurations, and thus these computing devices will initially all have the same user data. For example, in an office environment, many desktop machines can be set up with the same configuration. In order to expedite data deduplication in such situations, a deduplication client on one of the identical computing devices can be configured to add all of its user data to the deduplication system. As a result, this deduplication client will generate a set of one or more client locality tables, as well as a client pointer table (in embodiments that use client pointer tables). These client locality tables and/or client pointer table can then be copied to all of the other computing devices that have the same configuration. Accordingly, the initial value of these devices' client locality tables and/or client pointer table will already indicate that the user data has been added to the deduplicated data store.

Similarly, if the same file(s) are added to multiple computing devices at the same time (e.g., as part of a software upgrade or the addition of new software to a corporate environment), a deduplication client on one of the computing devices can be caused to add those new files to the deduplicated data store. The new client locality table information and/or pointer table information generated by that deduplication client can then be copied to the client locality tables and/or client pointer table of each other computing device to which the new files were added.

As noted above, deduplication can be performed on user data that is being backed up to a deduplicated data store. Accordingly, deduplication client 20 can be part of a backup application such as Backup Exec System Recovery (BESR), available from Symantec Corporation of Cupertino, Calif. Alternatively, deduplication client 20 can be an independent module that interfaces to such a backup application.

In such embodiments, a backup application can routinely (e.g., periodically or in response to predefined stimuli, such as an administrator generating a request for a backup at a particular time) generate backups of user data 40. The backup data is deduplicated prior to storage in order to reduce the amount of space needed (e.g., on storage device 70(1) of FIGS. 1 and 2) to store backups.

As noted above, the use of client locality tables increases the likelihood that consecutively generated signatures will match cached signatures in the client locality table. This trend is also true in backup systems. For example, suppose a volume-based backup is performed on a system and all of the user data clusters within a volume are sent to a deduplicated backup system. Later, when this same system is backed up again, large runs of the clusters will be sent to the deduplication database in the same order as those clusters were previously sent. While most clusters will have identical positions, there will be some changes, due to the addition of new files, the deletion of old files, and the editing of existing files. Also, some groups of clusters will be relocated, due to the copying of files and disk defragmentation. However, despite these changes, the ordering of the clusters within each of these groups will often be the same as it was previously.

If the deduplication server stores backups for multiple different clients (e.g., different user machines), additional efficiencies can be realized, since there is also a high correlation between clusters on different clients. Individual files are usually unfragmented, such that all clusters within a file that is common to two clients will be arranged in the same order on each client. In addition, application installs will have copied the same set of files to both clients in the same order and the file system will place the data making up the set of files in consecutive clusters on disk, resulting in the same ordering of clusters included in files that are common to two clients. Additionally, in an enterprise environment, most machines in a department will have been configured from a common deployment image or configured similarly by a computer manufacturer. In these situations, the initial layouts will often be nearly identical and there will be a very high locality correlation in the deduplication server's locality tables.

When portions of files are used (instead of portions of a volume, such as clusters) as the items of data being deduplicated, consecutive portions of a common file will often have the same order within the client locality table, resulting in lookups for partial file signatures possibly causing no more I/O than would be incurred if using signatures for complete files. Additionally, the files within a directory, especially if processed in alphabetical order, will often have a strong locality correlation when this directory is processed as part of a future backup. Also, when one of these files is seen on a different machine, it is likely that others of these files will be in the same directory (in the same order) on that other machine, resulting in an additionally increased hit rate in the deduplication server's locality table.

Figure 4:
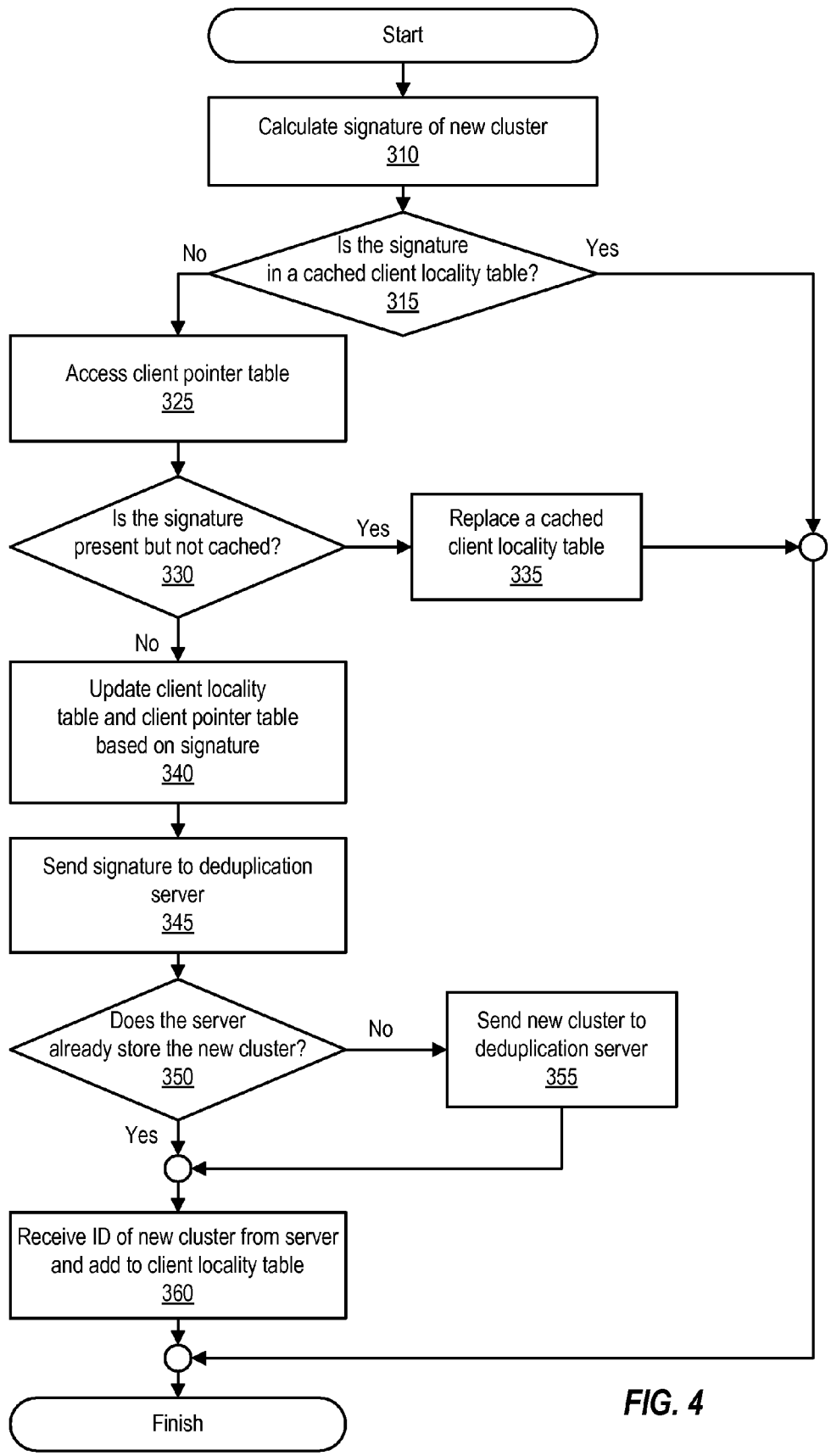
FIG. 4 is a flowchart of a method of performing data deduplication using a client locality table, according to one embodiment of the present invention.

FIG. 4 is a flowchart of a method of performing data deduplication using a client locality table. This method can be performed by a deduplication client like those shown in FIGS. 1 and 3. The method can be used to detect whether a cluster (or other unit of data) is already stored in a deduplicated data store, as well as whether it is necessary to send that cluster's signature to a deduplication server.

The method begins in response to a new cluster being processed by a deduplication client for storage in a deduplicated data store. This method can be initiated, for example, by a user requesting a backup of a certain file, set of files, or volume to a deduplicated data store, and the deduplication client being presented with information identifying the file(s) or volume to be backed up.

At 310, the signature of the new cluster is calculated (e.g., by calculating a hash of the new cluster). The new signature is compared to signatures stored in one or more cached client locality tables, as shown at 315 (if no client locality tables are cached, this operation can be omitted, and the signature can instead be compared to signatures stored in one or more on-disk client locality tables). If the new signature is present in the cached client locality table, then the new cluster identified by that signature is already stored in the deduplicated data store, and no further action needs to be taken. In particular, there is no need to send either the new cluster or its signature to the deduplication server. As noted above, searching the cached locality table(s) can involve performing linear or binary searches, depending on the embodiment.

If the cached locality table(s) do not store the new signature, then a client pointer table can be accessed, as shown at 325 (this table may also be cached). The new signature can be used to search the client pointer table for information corresponding to the new signature (e.g., by using a portion of the new signature as an index into the client pointer table). The identified information, if any, within the client pointer table identifies, directly or indirectly, a client locality table, if any, that contains the new cluster's signature. For example, the client pointer table can identify a subset of (i.e., fewer than all) on-disk signatures maintained by the deduplication client that is likely to contain the new signature. If the new signature is found in the subset, associated information can then identify the client locality table that contains the matching signature. If no corresponding information is found in the pointer table, all of the on-disk signatures may be searched to make this determination. Similarly, if no client pointer table is maintained, operation 325 can be omitted and the deduplication client can instead search all of the on-disk signatures.

Accordingly, in response to the information in the pointer table, a subset of on-disk signatures can be accessed. Based upon this subset, a determination can be made at 330 as to whether the new signature is present within a list maintained by the deduplication client but not currently cached in a client locality table.

If the new signature is already present, a cached client locality table can be replaced with an on-disk client locality table that contains the new signature, as shown at 335. If fewer than the maximum number of client locality tables are currently cached, the on-disk client locality table containing the new signature can instead simply be loaded into memory without replacing any already cached client locality table. Since the new signature is already present, a determination can also be made (in some embodiments, after performing additional checks) that the corresponding new cluster is also already stored by the deduplication system. Accordingly, the deduplication client does not need to send either the new cluster or its signature to the deduplication server.

If the new signature is not found within the identified subset (or the entire set of signatures, if no subset was identified in the client pointer table), then it indicates that the new cluster has not previously been processed by the deduplication client. Accordingly, the signature of the new cluster is sent to the deduplication server, as shown at 345. Additionally, the signature of the new cluster can be used to update the client locality table(s) (e.g., by adding the signature of the new cluster to a client locality table) and/or the client pointer table (e.g., by updating the pointer table and/or its associated on-disk structures, as shown at 340. For example, the deduplication client can add this signature to a client locality table and then add this signature and a reference to the signature's location in the client locality table to the client pointer table.

If the deduplication server indicates that the new cluster is already stored in the deduplicated data store, as indicated at 350, the deduplication client does not need to send a copy of the cluster to the deduplication server. If instead the deduplication server indicates that the cluster is not already present in the deduplicated data store, the deduplication client can send a copy of the new cluster to the deduplication server, as shown at 355. In either situation, the deduplication server can optionally return one or more identifiers that the deduplication server uses to identify and/or locate the new cluster, as shown at 360. This information can include an index or offset into a list of clusters maintained by the deduplication server, a session identifier identifying the session in which the cluster was first added to the deduplicated data store, a timestamp identifying a time at which the cluster was first added (or requested to be added) to the deduplicated data store, and/or a sequence number identifying when, relative to other clusters, the new cluster was added (or requested to be added) to the deduplicated data store. For example, a sequence number can be generated each time the deduplication server receives a request to add a new cluster to the deduplicated data store, and this sequence number can then be associated with the new cluster, if the attempt to add the cluster is successful (e.g., if the cluster is not already stored in the deduplicated data store).

Figure 5:
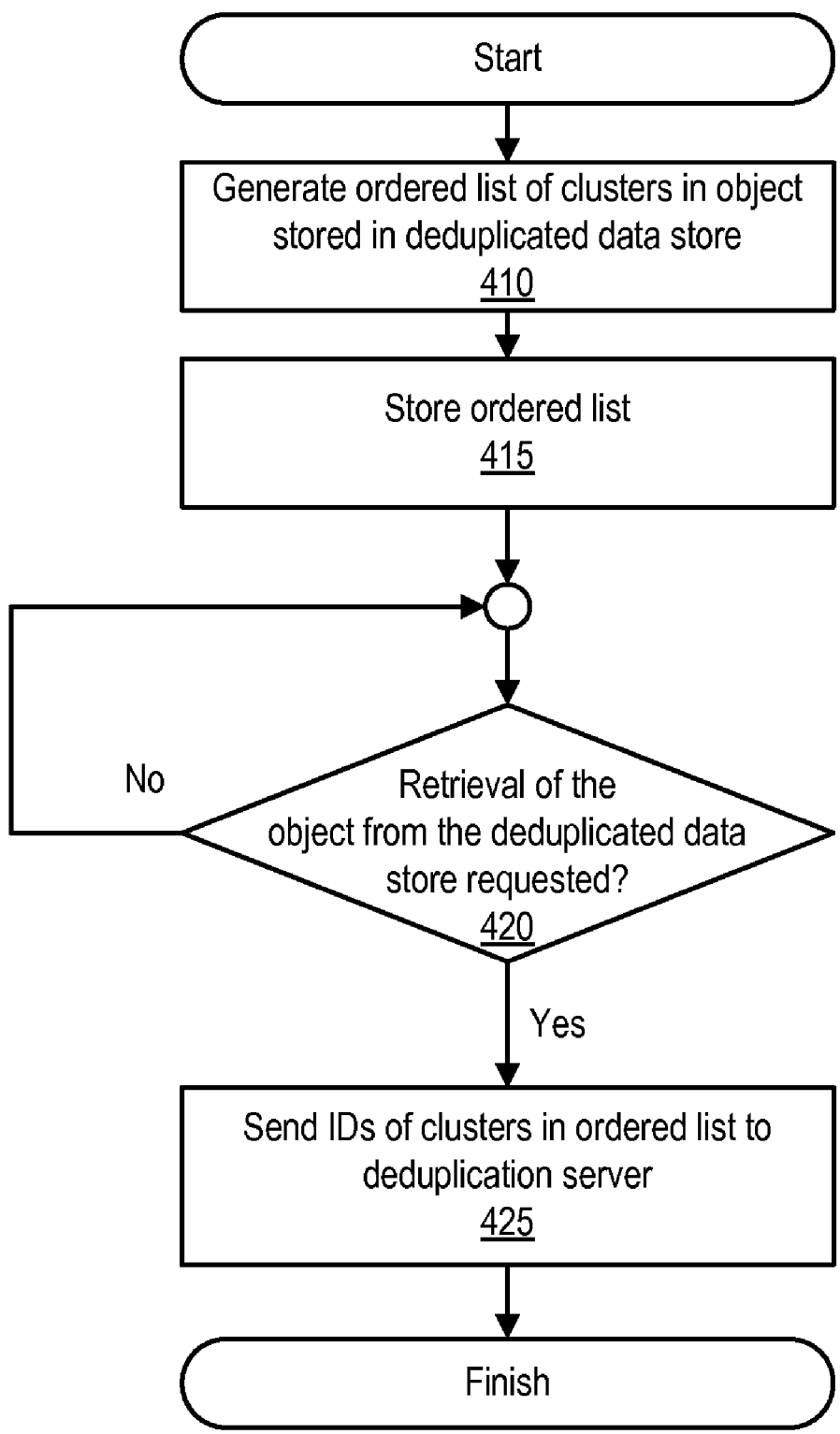
FIG. 5 is a flowchart of a method of storing information identifying the data items included in an object and then using that information to retrieve the object from the deduplicated data store, according to one embodiment of the present invention.

FIG. 5 is a flowchart of a method of storing information identifying the data items included in an object and then using that information to retrieve the object from the deduplicated data store. Like the method of FIG. 4, this method can be performed by a deduplication client like that shown in FIGS. 1 and 3.

The method begins at 410, when an ordered list of the clusters included in an object is generated. The object is a logical data object, such as a file, database tablespace, volume, or the like. The object has been stored in a deduplicated data store, and the list of clusters included in that object can be used to later retrieve the object form the deduplicated data store. The list of clusters can identify the clusters by signature and/or by one or more identifiers received from a deduplication server (e.g., in operation 360 of FIG. 4). The ordered list of clusters can then be stored, as shown at 415. In some embodiments, this ordered list is itself stored in the deduplicated data store.

If retrieval of the object from the deduplicated data store is later requested at 420 (e.g., in response to a backup application receiving a request to restore the object), the deduplication client sends one or more of the identifiers of the clusters in the ordered list to the deduplication server, as shown at 425. In some embodiments, instead of listing the identifiers individually in the message sent to the deduplication server, the deduplication client mergers multiple identifiers into a run list, as described above.

Figure 6:
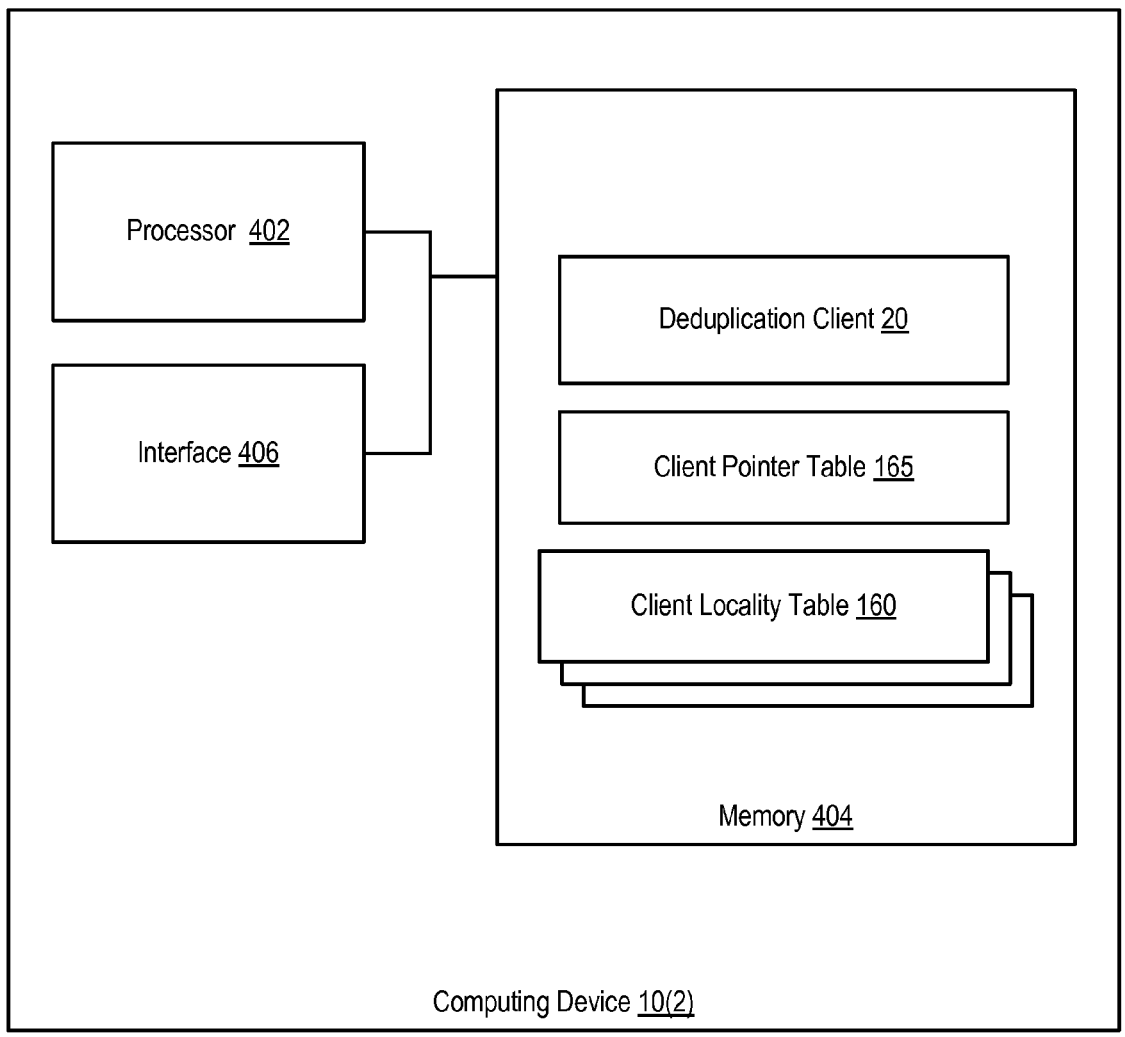
FIG. 6 is a block diagram of a computing device that implements a storage client that performs data deduplication using a cached locality table, according to one embodiment of the present invention.

FIG. 6 is a block diagram of a computing device that implements a storage client that performs data deduplication using a cached locality table. FIG. 6 illustrates how certain elements of a deduplication client can be implemented in software. FIG. 6 is a block diagram of a computing device 10(2) (e.g., as shown in FIGS. 1 and 3). As illustrated, computing device 10(2) includes one or more processors 402 (e.g., microprocessors, PLDs (Programmable Logic Devices), or ASICs (Application Specific Integrated Circuits)) configured to execute program instructions stored in memory 404. Memory 404 can include various types of RAM (Random Access Memory), ROM (Read Only Memory), Flash memory, MEMS (Micro Electro-Mechanical Systems) memory, magnetic core memory, and the like. Memory 404 can include both volatile and non-volatile memory. Computing device 10(2) also includes one or more interfaces 406. Processor 402, interface 406, and memory 404 are coupled to send and receive data and control signals by a bus or other interconnect.

Interface 406 can include a network interface to various networks (e.g., such as one coupling computing device 10(2) to computing device 10(1) of FIGS. 1 and 2) and/or interfaces to various peripheral buses. Interface 406 can also include an interface to one or more storage devices (e.g., storage device 70(2) of FIGS. 1 and 3). Interface 406 can, for example, be used to access information, such as clusters, client locality tables, and signatures, stored on a storage device, and/or to add signatures to a storage device. Similarly, interface 406 can be used to communicate with a client's web browser or other user interface if deduplication client 20 is executing remotely from another computing device.

In this example, all or part of certain deduplication system functionality, including a deduplication client 20, one or more client locality tables 160, and/or a client pointer table 165, are stored in memory 404 and can be implemented in software. Deduplication client 20 can generate client locality tables 160 and/or client pointer table 165 throughout the operation of the deduplication system. Additionally, deduplication client 20 can be configured to swap client locality tables in and out of memory according to a desired cache replacement policy.

As noted above, in some embodiments deduplication client 20 implements one or more cryptographic hash algorithms that can be applied to an item of data in order to generate a signature of that data. In one embodiment, deduplication client 20 implements a version of Secure Hash Algorithm (SHA), such as SHA-1. In other embodiments, other cryptographically secure (e.g., relatively collision resistant and non-invertible) hash algorithms can be implemented. Examples of hash algorithms that can be used by deduplication client 20 include (but are not limited to) Message Digest algorithm 5 (MD5), SHA-1, SHA-224, SHA-256, SHA-384, SHA-512, Research and Development in Advanced Communications Technologies in Europe (RACE) Integrity Primitives Evaluation Message Digest (RIPEMD), RIPEMD-128, RIPEMD-160, RIPEMD-250, RIPEMD-320, and RIPEMD-512.

The program instructions and data implementing deduplication client 20 can be stored on various computer readable storage media such as memory 404. In some embodiments, such software is stored on a computer readable storage medium such as a CD (Compact Disc), DVD (Digital Versatile Disc), hard disk, optical disk, tape device, floppy disk, and the like. In order to be executed by processor 402, the instructions and data implementing deduplication client 20 can be loaded into memory 404 from the other computer readable storage medium. The instructions and/or data implementing deduplication client 20 can also be transferred to computing device 10(2) for storage in memory 404 via a network such as the Internet or upon a carrier medium.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    searching one or more client locality tables for a new signature of a new data unit, wherein the one or more client locality tables comprise signatures of data units stored in a deduplicated data store;
    sending the new signature from a deduplication client to a deduplication server and adding the new signature to one of the one or more client locality tables, in response to not finding the new signature in the one or more client locality tables; and
    inhibiting sending of the new signature from the deduplication client to the deduplication server, in response to finding the new signature in the one or more client locality tables.

2. The method of claim 1, wherein the one or more client locality tables comprise a first signature added to the one or more client locality tables by the deduplication client during a first deduplication session and a second signature added to the one or more client locality tables by the deduplication client during a second deduplication session.

3. The method of claim 1, further comprising:
    receiving an identifier identifying the new data unit from the deduplication server, in response to sending the new signature to the deduplication server; and
    storing the identifier in one of the one or more client locality tables, wherein the storing the identifier associates the identifier with the new signature.

4. The method of claim 3, further comprising sending a request to retrieve the new data unit to the deduplication server, wherein the request comprises the identifier but not the new signature.

5. The method of claim 3, further comprising sending a request to retrieve a data object comprising the new data unit to the deduplication server, wherein the request comprises a run list, and wherein the run list specifies a range of one or more identifiers that comprises the identifier.

6. The method of claim 3, wherein the identifier comprises at least one of: a sequence number and a session identifier.

7. The method of claim 1, further comprising copying the one or more client locality tables from a first client computing device to a second client computing device, wherein the second client computing device implements the deduplication client.

8. The method of claim 1, further comprising accessing a client pointer table, in response to not finding the new signature in a cached one of the one or more client locality tables, wherein the pointer table indicates a subset of a set of signatures maintained by the deduplication client.

9. The method of claim 8, further comprising loading a new client locality table into a cache, in response to finding the new signature in the subset of the signatures indicated by the pointer table, wherein the new locality table comprises the new signature.

10. The method of claim 8, wherein the accessing the pointer table comprises using a portion of the new signature as an index into the pointer table.

11. A computer readable non-transitory storage medium storing executable program instructions, wherein, when executed, the executable program instructions are configured to implement a deduplication client, and wherein the deduplication client is configured to:
search one or more client locality tables for a new signature of a new data unit, wherein the one or more client locality tables comprise signatures of data units stored in a deduplicated data store;
send the new signature to a deduplication server and add the new signature to one of the one or more client locality tables, in response to not finding the new signature in the one or more client locality tables; and
inhibit sending of the new signature to the deduplication server, in response to finding the new signature in the one or more client locality tables.

12. The computer readable non-transitory storage medium of claim 11, wherein the one or more client locality tables comprise a first signature added to the one or more client locality tables by the deduplication client during a first deduplication session and a second signature added to the one or more client locality tables by the deduplication client during a second deduplication session.

13. The computer readable non-transitory storage medium of claim 11, wherein the deduplication client is further configured to:
receive an identifier identifying the new data unit from the deduplication server, in response to sending the new signature to the deduplication server; and
store the identifier in one of the one or more client locality tables, wherein storing the identifier in the one of the one or more client locality tables associates the identifier with the new signature.

14. The computer readable non-transitory storage medium of claim 13, wherein the deduplication client is further configured to send a request to retrieve the new data unit to the deduplication server, wherein the request comprises the identifier but not the new signature.

15. The computer readable non-transitory storage medium of claim 13, wherein the deduplication client is further configured to send a request to retrieve a data object comprising the new data unit to the deduplication server, wherein the request comprises a run list, and wherein the run list specifies a range of one or more identifiers that comprises the identifier.

16. The computer readable non-transitory storage medium of claim 11, wherein the one or more client locality tables were generated by a different deduplication client.

17. The computer readable non-transitory storage medium of claim 11, wherein the deduplication client is further configured to access a client pointer table, in response to not finding the new signature in a cached one of the one or more client locality tables, wherein the pointer table indicates a subset of a set of signatures maintained by the deduplication client.

18. The computer readable non-transitory storage medium of claim 17, wherein the deduplication client is further configured to load a new client locality table into a cache, in response to finding the new signature in the subset of the signatures indicated by the pointer table, wherein the new locality table comprises the new signature.

19. The computer readable non-transitory storage medium of claim 17, wherein accessing the pointer table comprises using a portion of the new signature as an index into the pointer table.

20. A system comprising:
storage means for storing one or more client locality tables, wherein the one or more client locality tables comprise signatures of data units stored in a deduplicated data store;
data deduplication client means, wherein the data deduplication client means:
search the one or more client locality tables for a new signature of a new data unit,
send the new signature to a deduplication server and add the new signature to one of the one or more client locality tables, in response to not finding the new signature in the one or more client locality tables, and
inhibit sending of the new signature to the deduplication server, in response to finding the new signature in the one or more client locality tables.

21. A system comprising:
a storage device storing user data comprising a plurality of data units; and
a data deduplication client coupled to access the storage device, wherein the data deduplication client is configured to:
search one or more client locality tables for a new signature of a first data unit of the plurality of data units;
send the new signature to a deduplication server and add the new signature to one of the one or more client locality tables, in response to not finding the new signature in the one or more client locality tables; and
inhibit sending of the new signature to the deduplication server, in response to finding the new signature in the one or more client locality tables.

* * * * *